United States Patent

Day et al.

[15] 3,671,728

[45] June 20, 1972

[54] ELECTRONIC REPEATER SERVO

[72] Inventors: Richard A. Day, Playa Del Rey; William E. French, Los Angeles, both of Calif.

[73] Assignee: Hughes Aircraft Company, Culver City, Calif.

[22] Filed: Oct. 5, 1970

[21] Appl. No.: 77,784

[52] U.S. Cl. ....................235/189, 235/186, 318/605

[51] Int. Cl. ....................G06g 7/22

[58] Field of Search ....................235/186, 189, 150.26, 150.27; 328/166; 318/629, 661, 605

[56] References Cited

UNITED STATES PATENTS

| | | | |
|---|---|---|---|
| 3,482,086 | 12/1969 | Caswell | 235/189 X |
| 3,438,026 | 4/1969 | Prill et al. | 318/661 X |
| 3,464,016 | 8/1969 | Kerwin et al. | 235/186 X |
| 3,493,737 | 2/1970 | Edelson | 235/189 |
| 3,505,514 | 4/1970 | Fathauer | 235/189 |

*Primary Examiner*—Joseph F. Ruggiero
*Attorney*—W. H. MacAllister, Jr. and George Jameson

[57] ABSTRACT

An electronic servo system utilizing a voltage controlled oscillator to drive a plurality of associated flip-flops to develop phase-variable, quadrature square wave output signals. These quadrature output signals are then used in a feedback loop, in conjunction with electrical signals corresponding to the sine and cosine functions of a shaft angle of a remote synchro transmitter, to drive demodulators whose outputs are summed in an amplifier to produce an error signal which controls the oscillator signal. The system operates to null the error signal and phase-lock the oscillator signal such that the electrical phases of the quadrature output signals are accurately positioned to be proportional to the shaft angle of the remote synchro transmitter. The respective quadrature output signals of, for example, two of the electronic servo systems may be utilized in conjunction with signals to be resolved to drive demodulators whose outputs are respectively summed in one channel and remodulated, demodulated and selectively summed in another channel to compute the vector rotations necessary for electronic resolution.

19 Claims, 8 Drawing Figures

Patented June 20, 1972 3,671,728

5 Sheets-Sheet 1

INVENTOR

RICHARD A. DAY,

WILLIAM E. FRENCH,

BY

Walter J. Adam

ATTORNEY

ELECTRONIC REPEATER SERVO

BACKGROUND OF THE INVENTION

1. Field of the Invention

This invention relates to repeater servos and resolvers and particularly to improved electronic repeater servos and coordinate resolution systems utilizing the electronic repeater servos.

2. Description of the Prior Art

Many fire control,navigational and other electronic systems use electromechanical followup or repeater servos to repeat a remote shaft angle giving such information as pitch, roll, etc., and position electromechanical resolvers. These repeater servos are relatively bulky and expensive, and have moving parts which require periodic preventive maintenance. The resolvers that are positioned by these repeater servos are then used, often in conjunction with other resolvers (also set up by other repeater servos), to form resolver chains to transform earth coordinates into aircraft coordinates or vice-versa. The disadvantages of these resolvers include: unreliability with sustained operation, requirement of periodic preventive maintenance, bulk, weight, heavy power consumption. Attempts to electronically perform the functions of resolvers often result in a more expensive, less accurate and equivalent volume system.

SUMMARY OF THE INVENTION

Briefly, applicants have provided a simple, low-power, lightweight, compact, economical, accurate, reliable and novel electronic repeater servo utilizing a phase-locked voltage controlled oscillator and associated circuitry to develop signals having electrical phases representative of a remote shaft angle, which may be used in conjunction with other electronic repeater servos and other electronic components, such as demodulators, a modulator and summers, to resolve signals from one set of rectangular coordinates into another set of rectangular coordinates.

It is therefore an object of this invention to provide an improved repeater servo.

Another object of this invention is to provide an all electronic repeater servo to repeat a remote shaft angle.

Another object of this invention is to provide an improved angle resolution system.

Another object of this invention is to provide an all electronic resolving system.

Another object of this invention is to provide a system for electronically resolving without moving parts the components of an angular motion.

A further object of this invention is to provide an accurate, reliable, low-power, lightweight and compact electronic resolver.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENT

Figure 1:
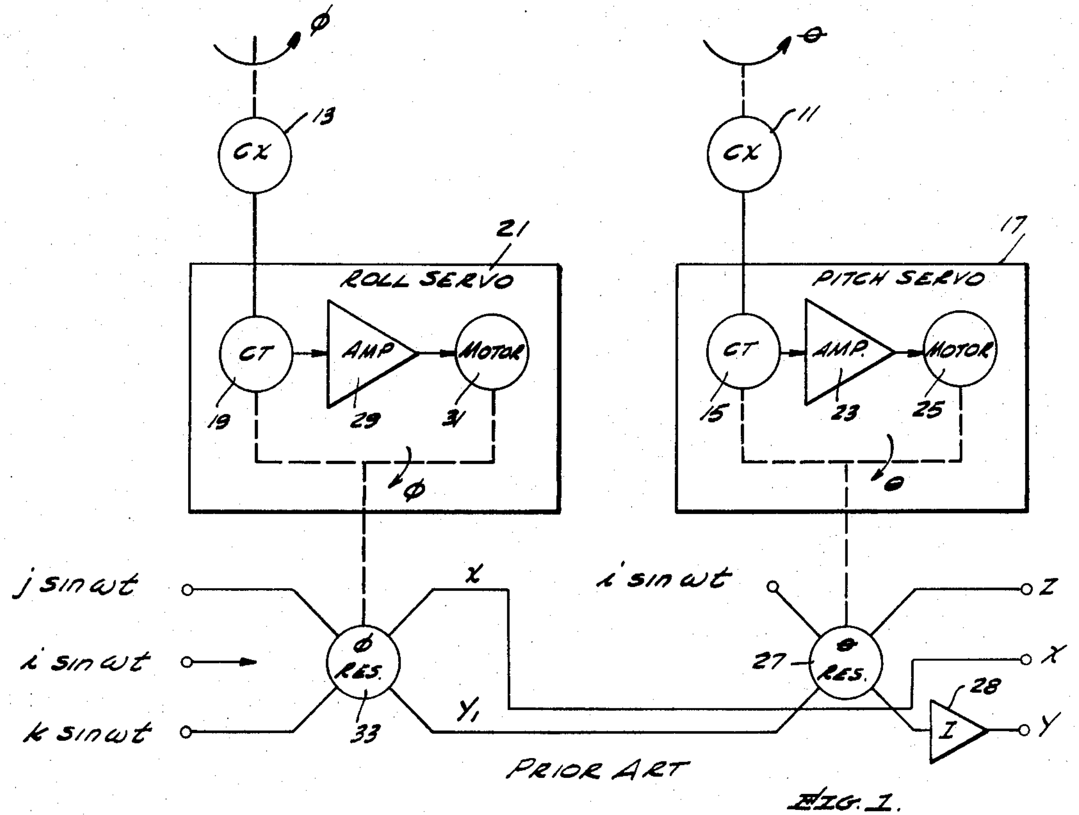
FIG. 1 is a schematic block diagram of a conventional electromechanical resolution system.

Referring now to the drawings, FIG. 1 illustrates a schematic block diagram of a conventional electromechanical resolution system. In FIG. 1 synchro transmitters (CX) 11 and 13 are mechanically coupled to components in, for example, an aircraft (not shown) in order to sense the mechanical pitch and roll angles theta ($\theta$) and phi ($\phi$), respectively. The synchro transmitters 11 and 13 have their stator windings (not shown) coupled to stator windings of a control transformer (CT) 15 contained within a repeater pitch servo 17 and a control transformer (CT) 19 contained within a repeater roll servo 21, respectively. The outputs of the rotors (not shown) of the control transformers 15 and 19 develop corresponding error voltages whenever the rotors are not orthogonally aligned with the rotors of the synchro transmitters 11 and 13, respectively. Any error voltage developed in the rotor of the control transformer 15 is amplified by a servo amplifier 23 in order to supply sufficient power to drive a servo motor 25. The motor 25 is mechanically coupled to the rotor of the control transformer 15 and to the rotor (not shown) of a resolver 27. The amplified error signal from the servo amplifier 23 drives the motor 25 to position the rotor of the control transformer 15 to null out the error signal, in a manner well-known in the art. At this time the angular position of the rotor of the resolver 27 corresponds to the angular position of the rotor of the synchro transmitter 11, namely $\theta$. The amplifier 23 and motor 25 are also contained in the pitch servo 17.

In a like manner, a servo amplifier 29 and a servo motor 31, which are contained also within the roll servo 21, operate to null the error from the rotor of the control transformer 19 and position the rotor (not shown) of a resolver 33 to correspond to the rotor position of the synchro transmitter 13, namely $\phi$.

The signals $i \sin \omega t, j \sin \omega t$ and $k \sin \omega t$ which represent the coordinates of the aircraft, are selectively applied in a conventional manner to the resolvers 33 and 27 and are resolved into the earth coordinates X, Y and Z in a manner well-known in the art. Basically, the $j \sin \omega t$ and $k \sin \omega t$ signals are applied to the resolver 33 to enable the resolver 33 to develop X and $Y_1$ signals (which will be explained later in equations (7) and (8)). The X and $Y_1$ signals from the resolver 33 and the signal $i \sin \omega t$ are applied to the resolver 27 and inverter 28 combination to generate Y and Z signals which will be explained later in equations (10) and (11)).

Figure 2:
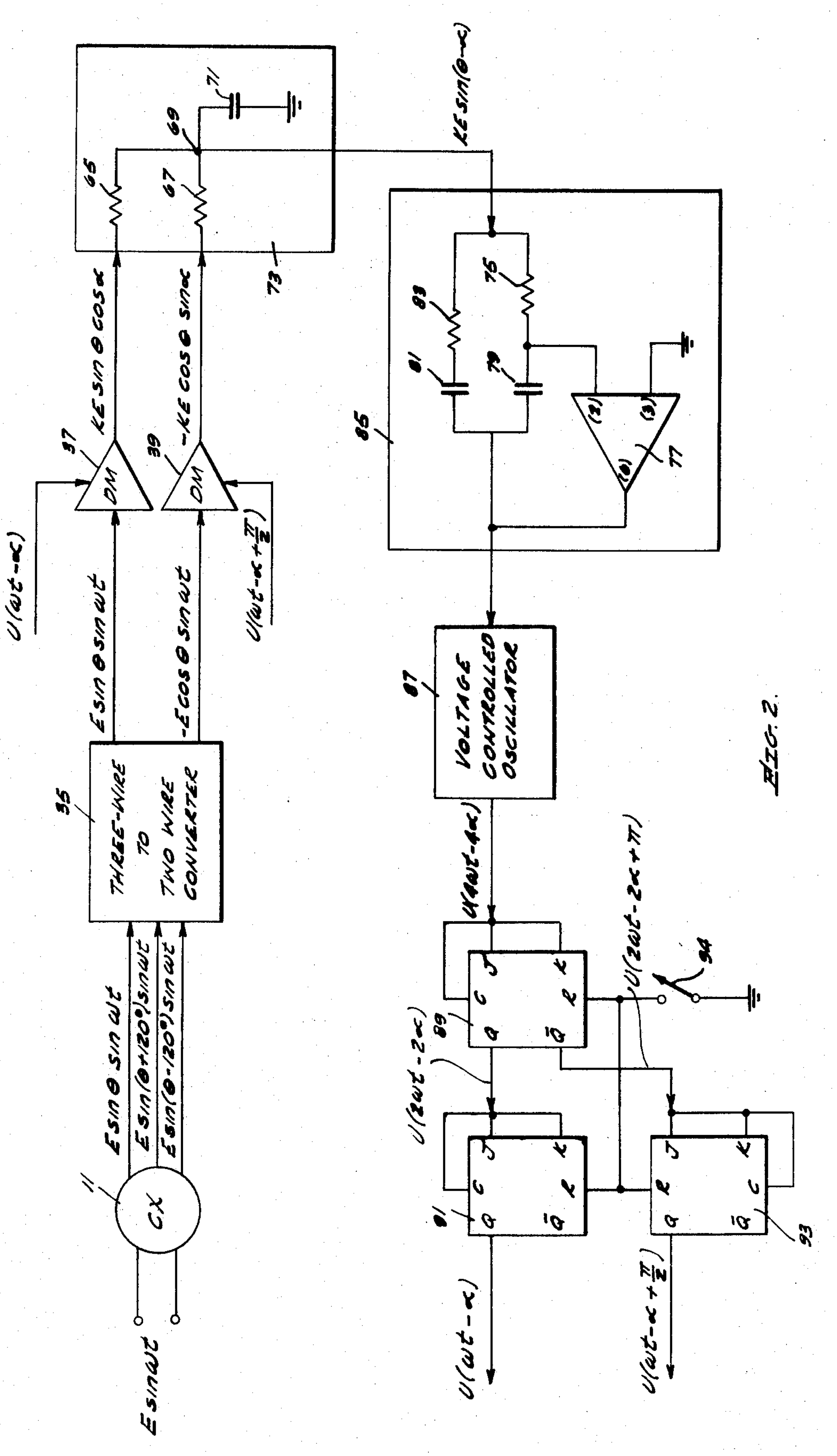
FIG. 2 is a schematic block diagram in accordance with one embodiment of this invention.

FIG. 2 is a schematic block diagram of an electronic repeater servo in accordance with an embodiment of the invention. In FIG. 2 a carrier signal $E \sin \omega t$ is applied to the rotor of the synchro transmitter 11. This carrier signal has an alternating current (AC) peak value of E, a time equal to $t$ and a frequency given by $\omega$, where $\omega = 2 \pi f$. As specified before, the position of the rotor of the synchro transmitter 11 may, for example, correspond to the pitch angle $\theta$ of an aircraft. The three stator outputs of the synchro transmitter 11 are $E \sin \theta \sin \omega t$, $E \sin (\theta + 120°) \sin \omega t$ and $E \sin (\theta - 120°) \sin \omega t$. The amplitudes of these stator outputs are dependent upon the angular position of the rotor of the synchro transmitter 11. The three stator outputs are applied to a three-wire to two-wire converter 35, which converts the angular information from the synchro transmitter 11 into sine and cosine signals related to the angular position of the rotor of the synchro transmitter 11. The converter 35 may be similar to the three-wire to two-wire converter illustrated in U.S. Pat. No. 3,493,737, issued Feb. 3, 1970. The sine and cosine signals from the converter 35 are respectively $E \sin \theta \sin \omega t$ and $-E \cos \theta \sin \omega t$. The E sin $\theta$ sin $\omega t$ signal is applied to a demodulator 37 while the −E cos $\theta$ sin $\omega t$ signal is applied to a demodulator 39. Quadrature demodulator reference signals U($\omega t$ − $\alpha$) and U($\omega t$ − $\alpha$ + $\pi/2$), which will be discussed later, are applied to the demodulators 37 and 39, respectively, in order to demodulate or remove the carrier signal sin $\omega t$ from the outputs of the converter 35. The demodulators 37 and 39 (as well as the demodulators illustrated in FIGS. 6, 7 and 8) are identical in structure and operation with the phase sensitive demodulator 37 being illustrated in FIG. 3.

Figure 3:
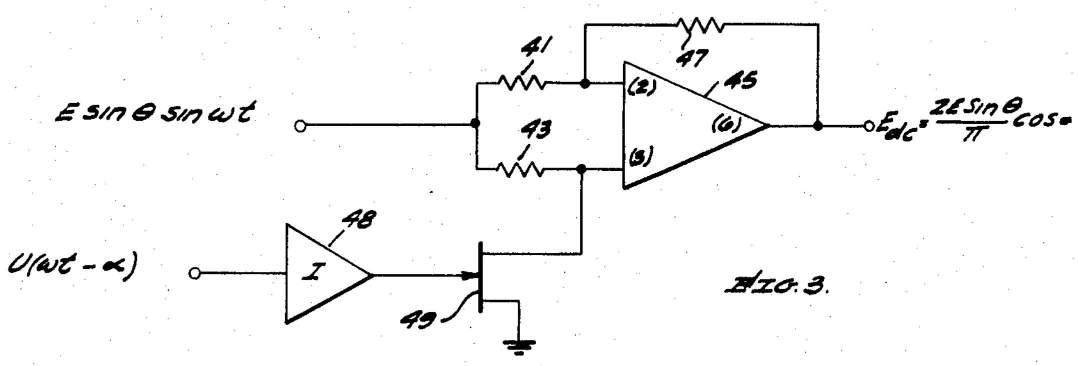
FIG. 3 is a schematic circuit diagram of one of the demodulators used in FIGS. 2, 6, 7 and 8.
Figure 4:
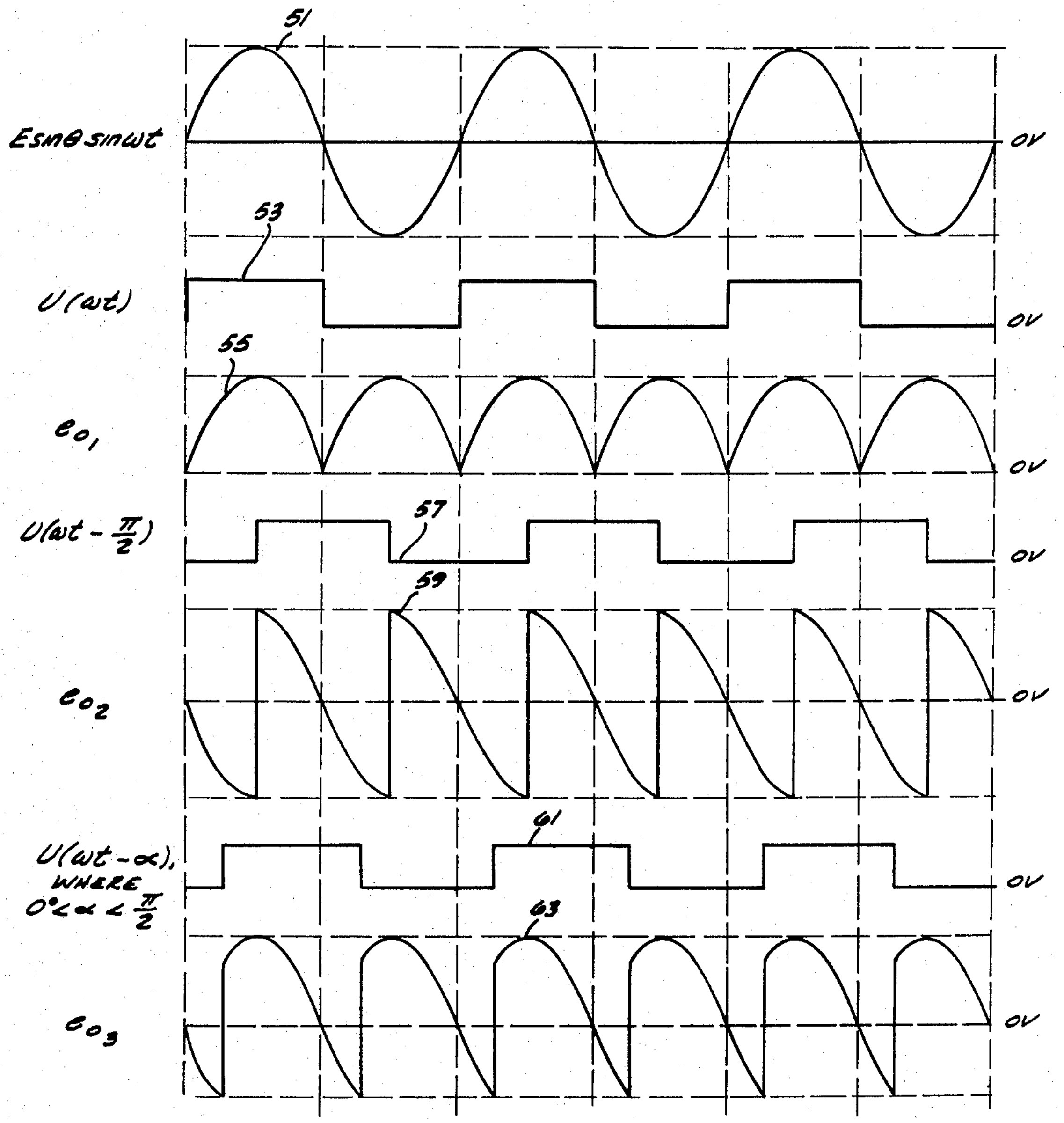
FIG. 4 illustrates waveshapes involved in explaining the operation of the demodulator of FIG. 3.

The operation of the demodulator 37 can best be understood by referring to FIGS. 3 and 4. The E sin $\theta$ sin $\omega t$ output of the converter 35 is applied to the junction of resistors 41 and 43 which have their other ends respectively coupled to the inverting input pin 2 and the noninverting input pin 3 of an operational amplifier 45. The operational amplifier 45 can be of any suitable type, such as a Fairchild $\mu$A741 frequency compensated operational amplifier manufactured by Fairchild Semiconductor Corporation. A resistor 47 is coupled between output pin 6 of the amplifier 45 and the inverting input pin 2 in order to provide a feedback path from the output to the inverting input. A demodulator reference square wave signal U($\omega t-\alpha$) is inverted by an inverter 48 and applied to the gate of a field effect transistor (FET) 49 which has its source-drain region coupled between the noninverting input pin 3 of the operational amplifier 45 and ground. The operation of the FET 49 is controlled by the demodulator reference square wave signal U($\omega t-\alpha$), which has the same frequency $\omega$ as the E sin $\theta$ sin $\omega t$ input which is shown as waveform 51. The phase difference between the demodulator reference signal and the input waveform 51 is $\alpha$. The values and types of the components of the demodulator 37 are selected so that the amplifier 45 acts as a unity gain inverter when the FET 49 is turned on by the application of a positive polarity signal to its gate and a unity gain follower when the FET 49 is turned off by the application of a negative polarity signal to its gate. It should be recalled that only a change in the angular position of the rotor of the control transformer 11 will cause the input signal E sin $\omega t$ to change, while the phase of the reference is changed by the system, as will be explained later. Therefore, for illustrative purposes, assume that the input signal E sin $\theta$ sin $\omega t$ does not shift in phase. The output of the amplifier 45 has a direct current (DC) component ($E_{dc}$) that is related to the phase angle difference $\alpha$ between the $E$ sin $\theta$ sin $\omega t$ input and the U($\omega t-\alpha$) reference as shown by the equation:

$$E_{dc} = 2E/\pi \sin\theta \cos\alpha. \qquad (1)$$

Letting $2/\pi = K$ (a constant) the equation now becomes:

$$E_{dc} = KE \sin\theta \cos\alpha. \qquad (2)$$

The validity of equation (2) will now be shown by a consideration of FIGS. 3 and 4.

When $\alpha = 0°$, the input E sin $\theta$ $\omega t$ and the reference are in phase and the reference now becomes U($\omega t$), which is shown in FIG. 4 as waveform 53. The waveform 53 is inverted by the inverter 48 and applied to the gate electrode of the FET 49. With the application of a negative voltage to its gate electrode the FET 49 is cut off, allowing the input signal E sin $\theta$ sin $\omega t$ to be directly applied through the resistors 41 and 47, and not through the amplifier 45, to the output pin 6 of the amplifier 45 without being inverted. With the application of a positive voltage to its gate electrode, the FET 49 conducts, shorting the noninverting input pin 3 to ground and allowing the input signal E sin $\theta$ sin $\omega t$ to be inverted by the amplifier 45. Therefore, the positive alternations of the E sin $\theta$ sin $\omega t$ input are not inverted by the amplifier 45 during the inverted positive alternations of the reference U($\omega t$), while the negative alternations of the E sin $\theta$ sin $\omega t$ input are inverted by the amplifier 45 during the inverted negative alternations of the U($\omega t$) reference. As a result, a full wave rectification is performed when $\alpha = 0°$ to produce the amplifier 45 output waveform 55, ($e_{o_1}$) which has an $E_{dc}$ equal to some positive DC voltage. On the other hand, when $\alpha$ is equal to $\pi/2$, the input and the reference signals, shown by waveforms 51 and 57, are 90° out of phase. Since, as specified before, the amplifier 45 acts as a unity gain follower when the FET 49 is on, and a unity gain inverter when the FET 49 is off, the amplifier 45 will develop an output signal ($e_{o_2}$) shown by waveform 59, which has an $E_{dc}$ equal to zero volts. In a like manner, when $\alpha$ equals some angle between 0° and 90°, the reference signal will appear as waveform 61 and will cause an amplifier 45 output signal ($e_{o_3}$) to be developed, as shown by the waveform 63, which has an $E_{dc}$ equal to some positive DC voltage having an amplitude between the amplitudes of the average DC values of the waveforms 55 and 59. In a similar manner, it can be shown that when $\alpha$ is equal to some angle between 0° and 90° or between 270° and 360°, the output $E_{dc}$ will have some positive DC value; whereas the output $E_{dc}$ will have some negative DC value when $\alpha$ is equal to an angle between 90° and 270°. As a result, the polarity and amplitude of the output $E_{dc}$ depend upon the value of cos $\alpha$. It has therefore been shown that an effective cosine multiplication or multiplication by the cosine of $\alpha$ is performed whenever the E sin $\theta$ sin $\omega t$ input is demodulated with a DC reference voltage of the form U($\omega t-\alpha$).

If the reference signal to the demodulator were shifted an additional 90°, placing the reference signal in the form U($\omega t$ − $\alpha + \pi/2$), an effective sine multiplication or multiplication by the sine of $\alpha$ would be achieved. As shown in FIG. 2, the reference signal to the demodulator 39 is in the form U($\omega t-\alpha$ + $\pi/2$). The demodulation of the −E cos $\theta$ sin $\omega t$ input to the demodulator 39 by a square wave reference signal in the form U($\omega t-\alpha+\pi/2$) produces a sine multiplication of this input, wherein the output $E_{dc}$ would be determined by the equation:

$$E_{dc} = (-2E/\pi) \cos\theta \sin\alpha \qquad (3)$$

Letting $2/\pi = K$, the equation now becomes:

$$E_{dc} = -KE \cos\theta \sin\alpha \qquad (4)$$

The validity of equation (4) can be established in the same manner in which the validity of equation (2) was shown.

The $KE$ sin $\theta$ cos $\alpha$ and $-KE$ cos $\theta$ sin $\alpha$ outputs from the demodulators 37 and 39 are applied through respective resistors 65 and 67 to a common junction point 69, from which a capacitor 71 is coupled to ground. The resistors 65 and 67 and the capacitor 71 form a summation network 73 which sums these two demodulator outputs in order to develop an error signal $\epsilon$, which can be written as:

$$\epsilon = KE \sin\theta \cos\alpha - KE \cos\theta \sin\alpha = KE \sin(\theta-\alpha) \qquad (5)$$

The error signal $\epsilon$ is a DC signal, since the demodulators 37 and 39 removed the carrier signal sin $\omega t$ and produced the respective cos $\alpha$ and sin $\alpha$ multiplications by demodulating with quadrature demodulator reference signals shifted in phase from the carrier signal by the angle $\alpha$. This error signal $\epsilon$ is applied through a resistor 75 to an inverting pin 2 of an operational amplifier 77, similar to the amplifier 45. The noninverting input pin 3 is grounded while the output is taken from an output pin 6 and fed back through feedback capacitor 79 to the inverting pin 2 of the amplifier 77. An additional feedback path is provided from the output pin 6 of the amplifier 77 through a capacitor 81 and resistor 83 to the junction point 69. The resistors 75 and 83, capacitors 79 and 81, and amplifier 77 form a filter 85, which is a very high gain amplifier operating as an integrator to supply a signal to control the operation of a voltage controlled oscillator (VCO) 87. The filter 85 is designed to have the following transfer function:

$$\frac{e_o}{KE \sin(\theta-\alpha)} = \frac{K_1(\tau S+1)}{S(S^2+2\zeta\omega nS+\omega_n^2}$$

where in standard terminology:

$e_o$ = the output signal of the filter 85

$KE$ sin ($\theta-\alpha$) = the input signal of the filter 85

S = La Place operator $k_1$, $\tau$, $\omega_n$ and $\xi$ = are all constants

The output of the filter 85 is then applied to the voltage controlled oscillator 87, which may be of any suitable type for generating square waves U of the form U($4\omega t-4\alpha$). The output of the oscillator 87 is applied to the J, K and C (clock) inputs of a conventional J–K flip-flop 89 which counts down the frequency of the oscillator 87 by a factor of two. The Q-output of the J–K flip-flop 89 is applied to the J, K and C inputs of a J–K flip-flop 91, which counts down the output frequency of the J–K flip-flop 89 by another factor of two. The $\overline{Q}$ output of the J–K flip-flop 89 is applied to the J, K and C inputs of another J-K flip-flop 93 in order to produce a two to one frequency countdown of the signal at the $\overline{Q}$ output of the flip-flop 89. The Q outputs of the J–K flip-flops 91 and 93 are the reference demodulation signals U $(\omega t - \alpha)$ and $U(\omega t - \alpha + \pi/2)$, which are respectively applied to the demodulators 37 and 39.

Figure 5:
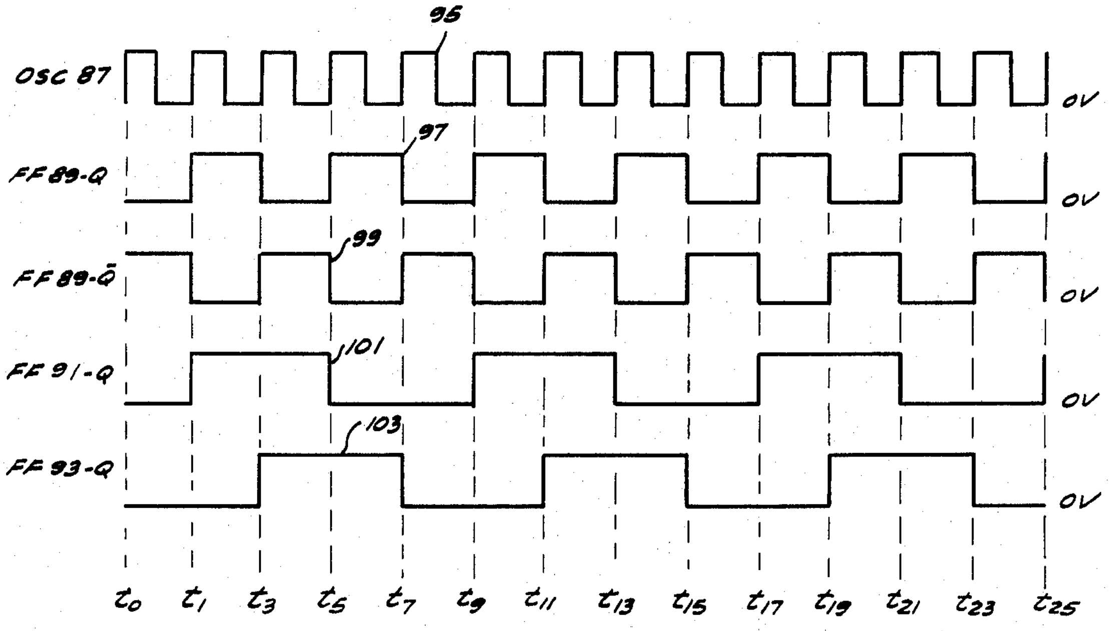
FIG. 5 illustrates waveshapes involved in the operation of the oscillator 87 and its associated flip-flops in FIG. 2.

The operation of the oscillator 87 and its associated J–K flip-flops 89, 91 and 93 can best be understood by referring to FIG. 2 and the waveforms of FIG. 5. In initial operation assume that the J–K flip-flops 89, 91 and 93 are reset by a switch 94 at time $t_o$ so that their Q outputs are placed in a "0" state and their $\overline{Q}$ outputs in a "1" state. The output of the filter 85 drives the oscillator 87 to develop the oscillator output signal $U(4\omega t - 4\alpha)$, which is shown by the waveform 95. The application of the positive going oscillator signal $U(4\omega t - 4\alpha)$ to the flip-flop 89 at the time $t_1$ causes the Q and $\overline{Q}$ outputs of the flip-flop 89 to switch and have the respective output signals illustrated by the waveforms 97 and 99. The U represents that the wave shape 95 is a square wave, the $4\omega t$ indicates the nominal output frequency of the oscillator 87 and the $4\alpha$ represents an angular phase shift, all of which are controlled by the output signal of the filter 85. As a result, the waveform 97 will have the same starting phase as the waveform 95 and is of the form $U(2\omega t - 2\alpha)$. Since the waveform 99 is the complement of the waveform 97, the waveform 99 is of the form $U(2\omega t - 2\alpha + \pi)$. The application of the waveform 97 to the flip-flop 91 at the time $t_1$ causes the Q output of the J–K flip-flop 91 to change from a "0" state to a "1" state. Through subsequent applications of the positive going portions of the waveform 97 at the times $t_5$, $t_9$, $t_{13}$, $t_{17}$, etc., the waveform 101 is developed at the Q output of the flip-flop 91.

The application of the waveform 99 to the J, K and C inputs of the flip-flop 93 at the time $t_1$ will not cause the Q-output of the flip-flop 93 to change from its "0" state, since the waveform 99 is negative-going at that time. However, at the time $t_3$ the rise in the voltage level of the waveform 99 will cause the Q output of the flip-flop 93 to change from a "0" state to a "1" state. Subsequent applications of the positive going portions of the waveform 99 at the times $t_7$, $t_{11}$, $t_{15}$, $t_{19}$, etc., will cause the flip-flop 93 to change its state in conformance with the waveform 103. Since the waveform 101 has the same starting phase as the waveform 95 but is at one-fourth of the frequency of the waveform 95, the waveform 101 will be in the form $U(\omega t - \alpha)$, which is used as the square wave demodulator reference for the demodulator 37. Since the waveform 103 has the same frequency as the waveform 101 but is 90° out of phase therewith, the waveform 103 has the form $U(\omega t - \alpha + \pi/2)$ which is used as the square wave demodulator reference for the demodulator 39.

The feedback of the demodulator reference signals $U(\omega t - \alpha)$ and $U(\omega t - \alpha + \pi/2)$ completes a phase locked loop wherein the output frequency and phase of the oscillator 87 are controlled by the output of the filter 85. In its steady state condition, this phase locked loop will cause the oscillator 87 to be locked to a frequency equal to four times that of the input carrier frequency $\omega$ of the carrier signal E sin $\omega t$, and will cause the phase angle $\alpha$ to assume that value necessary to drive the error signal $\epsilon$ given in equation (5) to "0." As can be readily seen in the equation (5), $\alpha$ must equal $\theta$ when the phase locked loop has stabilized. As a result, the $U(\omega t - \alpha)$ and $U(\omega t - \alpha + \pi/2)$ from the respective J–K flip-flops 91 and 93 are electrical signals which repeat the shaft angle position $\theta$ of the synchro transmitter 11. If the frequency of the carrier signal E sin $\omega t$ is 400 Hz, which is a conventional frequency used in aircraft, the oscillator 87 will lock into a frequency of exactly 1,600 Hz. It has therefore been shown that the electronic circuitry of FIG. 2 can be used to perform the function of the electromechanical pitch servo 17 of FIG. 1 in order to repeat a remote shaft position.

Figure 6:
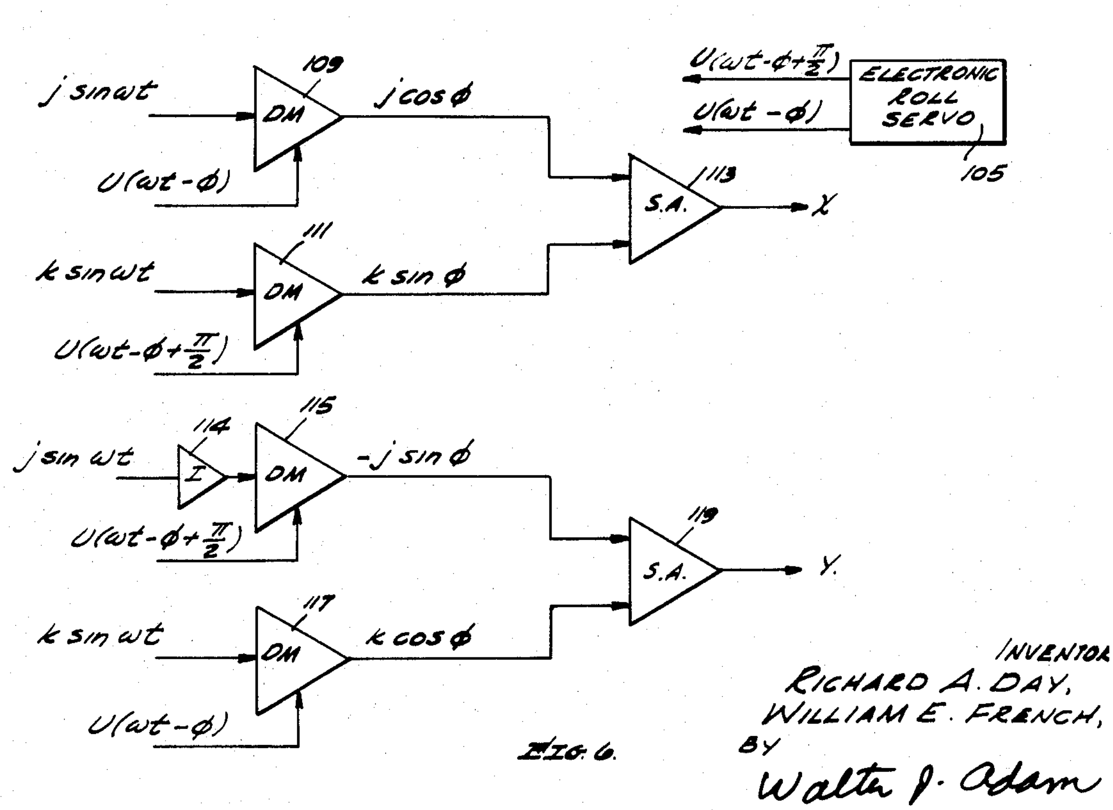
FIG. 6 illustrates an electronic resolver, equivalent to the resolver 33 of FIG. 1, which can be used in conjunction with the electronic servo of FIG. 2 to produce a two-coordinate resolution system.

Referring now to FIG. 6, an electronic resolution system is illustrated utilizing an electronic resolver and an electronic repeater servo. The circuitry illustrated in FIG. 6 is all electronic and electronically performs without any moving parts the resolution function that is electromechanically performed by the roll servo 21 and resolver 33 of FIG. 1. An electronic repeater roll servo 105 is used, in conformance with the teachings related to FIG. 2, to set up the quadrature demodulator reference signals, $U(\omega t - \phi)$ and $U(\omega t - \phi + \pi/2)$, which correspond to the roll angle $\phi$, for example, of an aircraft. Once the electronic repeater servo 105 has been set up to develop the reference signals representing the roll angle $\phi$, the transformation from aircraft coordinates $j$ and $k$ to earth coordinates $X$ and $Y_1$, for example, is accomplished by mechanizing in FIG. 6 the following equations:

$$X = j\cos\phi + K\sin\phi \qquad (7)$$

$$Y_1 = k\cos\phi - j\sin\phi \qquad (8)$$

The input signals to be resolved are $j \sin \omega t$ and $k \sin \omega t$. The $j \sin \omega t$ and $k \sin \omega t$ signals are respectively applied to demodulators 109 and 111. Square wave demodulator reference signals $U(\omega t - \phi)$ and $U(\omega t - \phi + \pi/2)$ from the electronic roll servo 105 are applied to the respective demodulators 109 and 111 to cause the demodulators 109 and 111 to produce $j \cos \phi$ and $k \sin \phi$ signals in conformance with the teachings disclosed in relation to FIG. 3. The $j \cos \phi$ and $k \sin \phi$ demodulated signals from the demodulators 109 and 111 are summed in a summing amplifier 113, which may be of any conventional type, to produce the output signal $X$ as shown in equation (7). The $j \sin \omega t$ signal is also applied through an inverter 114 to a demodulator 115, while the $k \sin \omega t$ signal is also applied to a demodulator 117. The demodulator reference signals $U(\omega t - \phi + \pi/2)$ and $U(\omega t - \phi)$ are also applied to the respective demodulators 115 and 117 to cause these demodulators to respectively develop output signals $-j \sin \phi$ and $k \cos \phi$. The $-j \sin \phi$ and $K \cos \phi$ signals from the demodulators 115 and 117, respectively, are summed in a summing amplifier 119 in order to produce the output signal $Y_1$ as shown in equation (8). Thus, it has been shown that an electronic repeater servo and an electronic resolver can transform two quantities to be resolved from a first to a second two-coordinate system. It will now be shown in FIG. 7 how two of the electronic servos of FIG. 2 and an electronic resolver chain can electronically perform the three-coordinate resolution shown in FIG. 1 without any moving parts.

Figure 7:
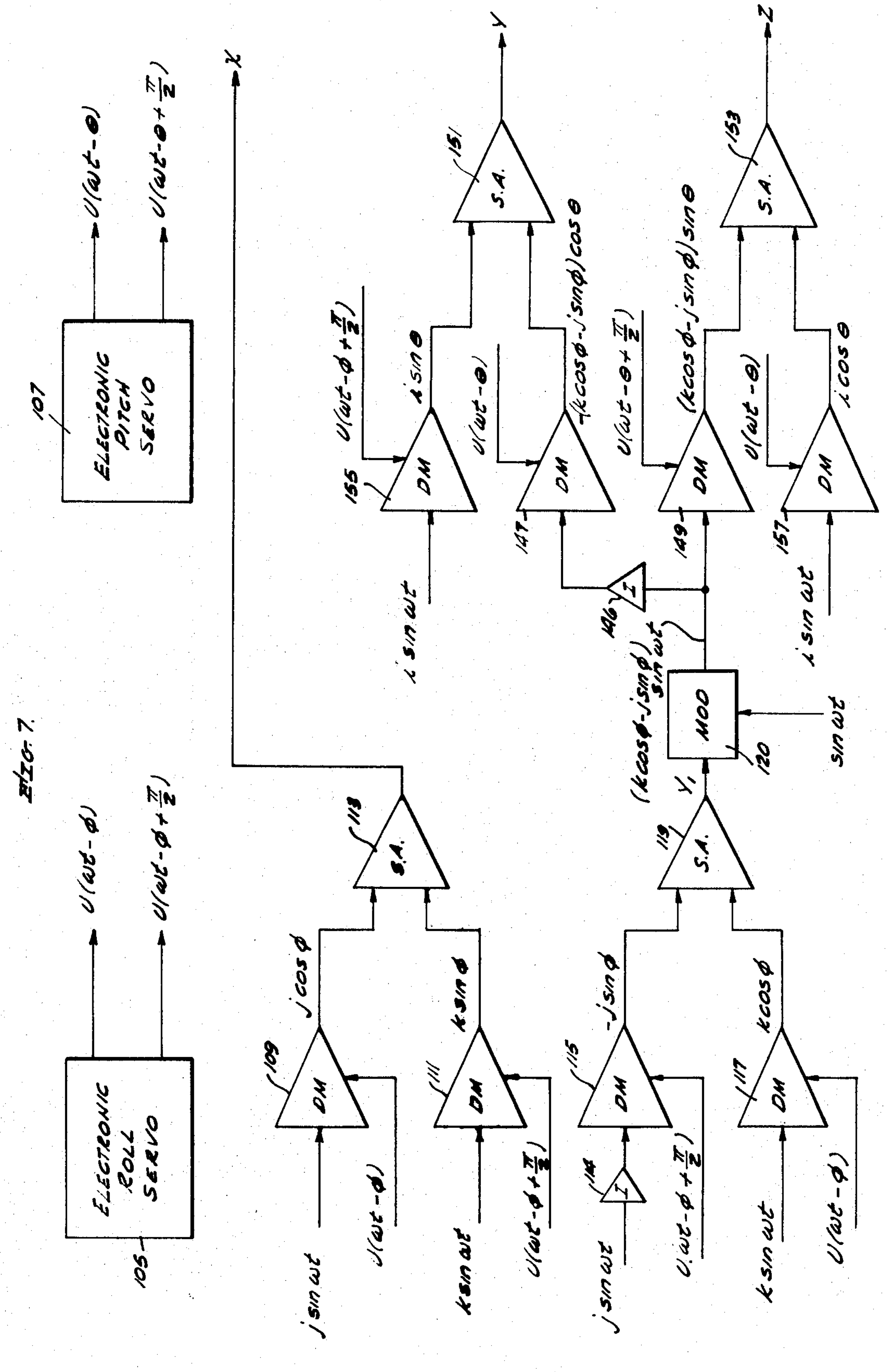
FIG. 7 is a schematic block diagram illustrating how two of the electronic servos of FIG. 2 and an electronic resolver chain can electronically perform the three-coordinate resolution shown in FIG. 1.

Referring now to FIG. 7, two electronic repeater servos 105 and 107 are used, in conformance with the teachings related to FIG. 2, to respectively set up resolver angles $\phi$ and $\theta$, which may represent the roll and pitch angles of an aircraft. Once the electronic repeater servos 105 and 107 have been set up to develop electronic signals corresponding to the roll and pitch angles, the transformation from aircraft coordinates $i$, $j$ and $k$ to earth coordinates $X$, $Y$ and $Z$, for example, is accomplished by mechanizing in FIG. 7 the following equations:

$$X = j\cos\phi + k\sin\phi \qquad (9)$$

$$Y = i\sin\theta - k\cos\phi\cos\theta + j\sin\phi\cos\theta \qquad (10)$$

$$Z = i\cos\theta + k\cos\phi\sin\theta - j\sin\phi\sin\theta \qquad (11)$$

The input signals to be resolved are i sin $\omega t$, $j \sin \omega t$ and $k \sin \omega t$, which are AC signals formed at the outputs of a synchro transmitter (not shown), similar to the synchro transmitter 11 in FIG. 2, through the excitation by the signal E sin $\omega t$. The operation of the inverter 114, the demodulators 109, 111, 115 and 117 and the summing amplifiers 113 and 119 are the same as that described in relation to FIG. 6, with the output signal $X$ of equations (7) and (9) and the $Y_1$ signal of equation (8) being produced in the manner described in relation to FIG. 6. The $Y_1$ output of the summing amplifier 119 is applied to a modulator 120, to which the carrier signal sin $\omega t$ is also applied. The modulator 120 remodulates the $Y_1$ input, $k \cos \phi - j \sin \phi$, with the carrier sin ωt to develop an output signal $(k \cos \phi - j \sin \phi) \sin \omega t$.

Figure 8:
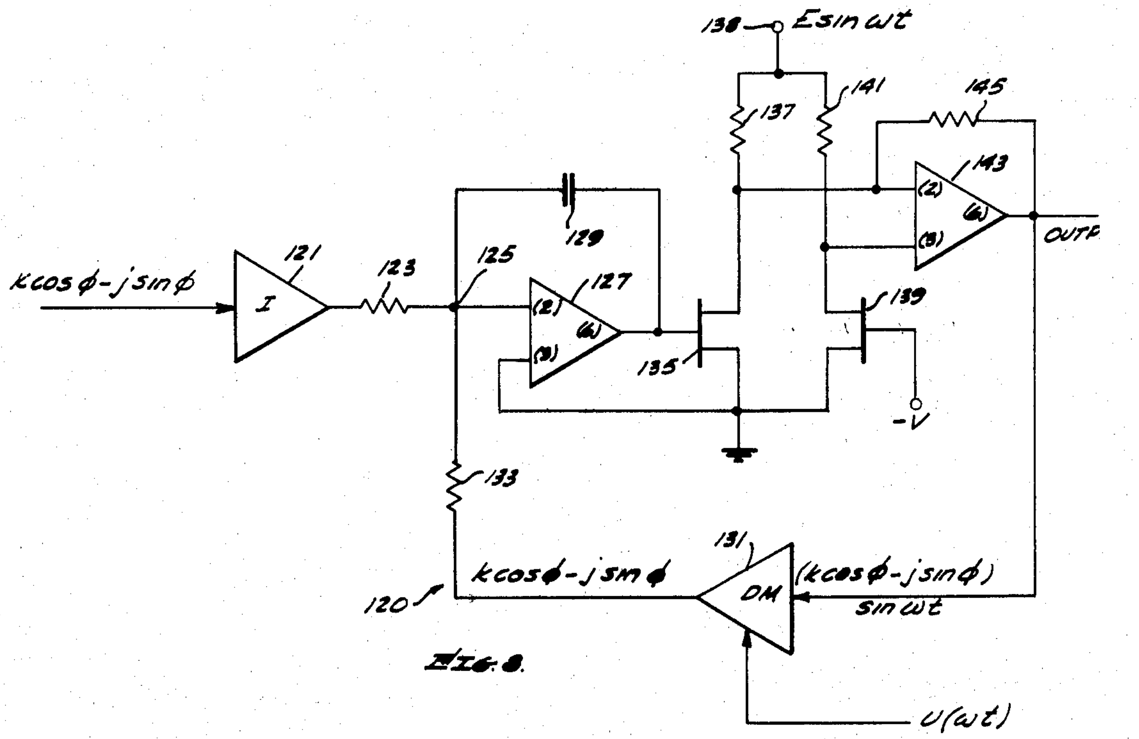
FIG. 8 is a schematic circuit diagram of the modulator 120 used in FIG. 7.

The modulator 120 is illustrated in FIG. 8 and will now be explained. In FIG. 8 the input signal, $k \cos \phi - j \sin \phi$, is applied through a serially coupled inverter 121 and resistor 123 to provide a $-(k \cos \phi - j \sin \phi)$ signal to a summation point 125, which is connected to the inverting input pin 2 of an operational amplifier 127 similar to the amplifier 45. The non-inverting pin 3 of the amplifier 127 is grounded while the output pin 6 of the amplifier 127 is coupled through a capacitor 129 back to the summation point 125 to cause the amplifier 127 to operate as an integrator. The output from a demodulator 131, which will be discussed later, is applied through a resistor 133 to the summation point 125. The output of the amplifier 127 is applied to the gate terminal of a FET 135. The FET 135 has its drain coupled to ground, and its source coupled through a resistor 137 to a terminal 138 for the reception of the carrier signal E sin $\omega t$. Another FET 139 has its gate connected to a negative DC voltage source (−V), its drain connected to ground, and its source coupled through a resistor 141 to the terminal 138 to also receive the carrier signal E sin $\omega t$. The source electrodes of the FETs 135 and 139 are respectively coupled to the inverting and non-inverting pins 2 and 3 of an operational amplifier 143, similar to the amplifier 127, which has its output pin 6 coupled through a resistor 145 to its inverting input pin 2 to provide a feedback path. The output of the operational amplifier 143 is a $(k \cos \phi - j \sin \phi) \sin \omega t$ signal, which consists of a remodulation by the carrier signal E sin $\omega t$ of the $k \cos \phi - j \sin \phi$ input signal. The output from the amplifier 143 is also fed back to the demodulator 131, which is similar to the demodulator of FIG. 3. The demodulator 131 also receives a square wave demodulator reference signal U ($\omega t$) in order to remove the carrier signal sin $\omega t$ and develop a $k \cos \phi - j \sin \phi$ output signal.

In the operation of the modulator 120 illustrated in FIG. 8, the output of the demodulator 131 is summed with the inverted $k \cos \phi - j \sin \phi$ input at the summation point 125. The modulator 120 operates to provide an output signal from the amplifier 143 such that the DC components of the two inputs to the summation point 125 will algebraically add to cause the summation point 125 to be effectively placed at a DC ground potential, since the non-inverting pin 3 of the amplifier 127 is at a ground potential. In order for the system to null out at the summation point 125, the output of the demodulator 131 must be $k \cos \phi - j \sin \phi$. The output signal of the operational amplifier 143 will therefore be $(k \cos \phi - j \sin \phi) \sin \omega t$, since this is the only output signal which, when demodulated by the demodulator 131, has a DC component of the proper amplitude and polarity to cancel the DC component of the inverted input signal, $-(k \cos \phi - j \sin \phi)$, being applied to the summation point 125.

Assume that the AC output signal of the operational amplifier 143 is such that the demodulator 131 produces an output signal which causes the summation point 125 to develop a signal having a positive DC potential with respect to ground. This resultant signal at the summation point 125 is inverted by the amplifier 127 and then applied to the gate of the FET 135. If the negative voltage at the gate of the FET 135 is less negative than −V, the FET 135 will conduct more heavily than the FET 139, since these are "N" channel FETs. The FETs 135 and 139 may be of any suitable type, such as a VCR-20 which is manufactured by Siliconix of Sunnyvale, California, which will effectively act as a variable resistance dependent upon the amplitude of the gate potential being applied. Since the FET 135 has a less negative DC potential applied to its gate electrode than −V, the FET 135 will conduct more heavily and therefore have a smaller internal resistance than that of the FET 139. As a result, the non-inverting input pin 3 will have a larger input signal than the inverting input pin 2 of the amplifier 143. The output of the amplifier 143 will therefore be in phase with the bridge excitation signal E sin $\omega t$. It should be recalled that in FIG. 4 the demodulation of the E sin $\theta$ sin $\omega t$ signal (waveform 51) by the reference signal U($\omega t$) (waveform 53) developed a positive output voltage (waveform 55). Therefore, the demodulation of the $(k \cos \phi - j \sin \phi) \sin \omega t$ signal by the reference signal U($\omega t$) in the demodulator 131 will develop a positive voltage $(k \cos \phi - j \sin \phi)$ at the output of the demodulator 131 which is necessary at the point 125 to stabilize the operation of the modulator 120 to develop the $(K \cos \phi - j \sin \phi) \sin \omega t$ signal.

The $(k \cos \phi - j \sin \phi) \sin \omega t$ output signal of the modulator 120 is applied through an inverter 146 to a demodulator 147 and is also applied directly to a demodulator 149. Square wave demodulator reference signals U $(\omega t - \theta)$ and U $(\omega t - \theta + \pi/2)$, from an electronic pitch servo 107 similar to the servo 105, are respectively applied to the demodulators 147 and 149 to affect respective cosine and sine multiplications resulting from the demodulation of the inputs to the demodulators 147 and 149. The output of the demodulator 147 is $-(k \cos \phi - j \sin \phi) \cos \theta$, which is applied to a summing amplifier 151, similar to the amplifier 113. The output of the demodulator 149 is $(k \cos \phi - j \sin \phi) \sin \theta$, which is applied to a summing amplifier 153, similar to the amplifier 113.

The third of the three input signals to be resolved is $i \sin \omega t$, which is applied as the input signal to demodulators 155 and 157. The square wave demodulator reference signals U$(\omega t - \theta + \pi/2)$ and U$(\omega t - \theta)$ from the electronic pitch servo 107 are respectively applied to the demodulators 155 and 157 to demodulate or remove the carrier sin $\omega t$ from the input signal $i$ sin $\omega t$. The output signal of the demodulator 155 is $i \sin \theta$, which is summed in the amplifier 151 with the $-(k \cos \phi - j \sin \phi) \cos \theta$ output of the demodulator 147 to produce the output signal $Y$ as shown in equation (10). The output signal of the demodulator 157 is $i \cos \theta$, which is summed in the amplifier 153 with the $(k \cos \phi - j \sin \phi) \sin \theta$ output of the demodulator 149 to produce the output signal Z as shown in equation (11).

The concepts of the invention thus provide an electronic repeater servo which can electronically repeat a remote shaft angle, and which, in one embodiment, when combined with an electronic resolver becomes an electronic resolution system which can perform a two-dimensional transformation from one set of rectangular coordinates into another set of rectangular coordinates, and which in another embodiment performs a three-dimensional transformation.

While the salient features have been illustrated and described, it should be readily apparent to those skilled in the art that modifications can be made within the spirit and scope of the invention as set forth in the appended claims.

What is claimed is:

1. An electronic system responsive to first sine and cosine information signals at a first frequency and representing a first angular position comprising:

a first oscillator for developing a first oscillator signal;

first switching means, coupled to said first oscillator, being responsive to the first oscillator signal for developing quadrature first and second reference signals;

first demodulating means, coupled to said first switching means and coupled to receive the first information signals, for demodulating the first sine and cosine information signals in order to respectively develop first and second demodulated signals; and first control means, coupled between said first demodulating means and said first oscillator, being responsive to the first and second demodulated signals for controlling the frequency and phase of the first oscillator signal such that the quadrature first and second reference signals from said first switching means are at the first frequency and have respective phase angles related to the first angular position.

2. The system of claim 1 further including:

first means coupled to said first demodulating means for converting the first angular position into the first sine and cosine information signals at the first frequency.

3. The system of claim 1 wherein said first control means comprises:

a summing circuit coupled to said first demodulating means for summing the first and second demodulated signals to develop a first error signal; and filter circuit means coupled between said summing circuit and said first oscillator for developing a first control signal as a function of the first error signal to control the frequency and phase of the first oscillator signal.

4. The system of claim 3 wherein said first switching means comprises:

a first flip-flop circuit coupled to said first oscillator for counting down the first oscillator signal to develop first and second complementary signals; and second and third flip-flop circuits coupled to said first flip-flop circuit for respectively developing the quadrature first and second reference signals in response to the respective application of the first and second complementary signals thereto.

5. The system of claim 4 wherein said first demodulating means comprises:

a first demodulator coupled between said second flip-flop circuit and said summing circuit for developing the first demodulated signal in response to the first sine information signal and first reference signal; and a second demodulator coupled between said third flip-flop circuit and said summing circuit for developing the second demodulated signal in response to the first cosine information signal and second reference signal.

6. The system of claim 5 wherein said first oscillator is a voltage controlled oscillator responsive to the first control signal for causing the quadrature first and second reference signals from said second and third flip-flop circuits to be at the first frequency and have respective phase angles related to the first angular position when the first error signal is nulled.

7. The system of claim 6 further including:

first means coupled to said first and second demodulators for converting the first angular position into the first sine and cosine information signals at the first frequency.

8. The system of claim 1 further including:

first resolution means coupled to said first switching means, said first resolution means including second means for receiving first and second input signals to be resolved from a first to a second two-coordinate system, said first resolution means being responsive to the quadrature first and second reference signals from said first switching means for resolving the first and second input signals into first and second resolved signals in the second two-coordinate system.

9. The system of claim 8 wherein said first resolution means comprises:

first resolver demodulation means, coupled to said first switching means, being selectively responsive to the first and second input signals and the first and second reference signals for developing first, second, third and fourth component signals; and first summing means coupled to said first resolver demodulation means for selectively summing the first, second, third and fourth component signals to provide the first and second resolved signals.

10. The system of claim 9 wherein said first control means comprises:

second summing means coupled to said first demodulating means for summing the first and second demodulated signals to develop a first error signal; and filter circuit means coupled between said second summing means and said first oscillator for developing a first control signal as a function of the first error signal to control the frequency and phase of the first oscillator signal.

11. The system of claim 10 wherein said first switching means comprises:

a first flip-flop circuit coupled to said first oscillator for counting down the first oscillator signal to develop first and second complementary signals; and second and third flip-flop circuits coupled to said first flip-flop circuit for respectively developing the quadrature first and second reference signals in response to the respective application of the first and second complementary signals thereto.

12. The system of claim 11 wherein said first demodulating means comprises:

a first demodulator coupled between said second flip-flop circuit and said second summing means for developing the first demodulated signal in response to the first sine information signal and first reference signal; and a second demodulator coupled between said third flip-flop circuit and said second summing means for developing the second demodulated signal in response to the first cosine information signal and second reference signal.

13. The system of claim 12 wherein said first oscillator is a voltage controlled oscillator responsive to the first control signal for causing the quadrature first and second reference signals from said second and third flip-flop circuits to be at the first frequency and have respective phase angles related to the first angular position when the first error signal is nulled.

14. The system of claim 13 wherein said first resolver demodulation means comprises:

a third demodulator, coupled to said second flip-flop circuit, being responsive to the first input signal and the first reference signal for developing the first component signal;

a fourth demodulator, coupled to said third flip-flop circuit, being responsive to the second input signal and the second reference signal for developing the second component signal;

a fifth demodulator, coupled to said third flip-flop circuit, being responsive to the first input signal and the second reference signal for developing the third component signal; and a sixth demodulator, coupled to said second flip-flop circuit, being responsive to the second input signal and the first reference signal for developing the fourth component signal.

15. The system of claim 14 wherein said first summing means comprises:

a first amplifier coupled to said first and second demodulators for developing the first resolved signal; and a second amplifier coupled to said third and fourth demodulators for developing the second resolved signal.

16. The system of claim 15 further including:

first means coupled to said first demodulating means for converting the first angular position into the first sine and cosine information signals at the first frequency.

17. The system of claim 1 further including:

a second oscillator for developing a second oscillator signal;

second switching means, coupled to said second oscillator, being responsive to the second oscillator signal for developing quadrature third and fourth reference signals;

second demodulating means, coupled to said second switching means and adapted to receive at a first frequency second sine and cosine information signals representing a second angular position, for demodulating the second sine and cosine information signals in order to respectively develop third and fourth demodulated signals;

second control means, coupled between said second demodulating means and said second oscillator, being responsive to the third and fourth demodulated signals for controlling the frequency and phase of the second oscillator signal such that the quadrature third and fourth reference signals from said second switching means are at the first frequency and have respective phase angles related to the second angular position;

first resolution means, coupled to said first switching means and adapted to receive first and second input signals to be resolved from a first to a second three-coordinate system, for resolving the first and second input signals into a first resolved signal in the second three-coordinate system and for developing a combined signal;

second means coupled to said first resolution means for remodulating the combined signal to develop a remodulated combined signal at the first frequency; and second resolution means, coupled to said second means and said second switching means and adapted to receive a third input signal to be resolved from the first to the second three-coordinate system, for resolving the third input signal and the remodulated combined signal into second and third resolved signals in the second three-coordinate system.

18. A resolving system comprising:

a first phase-locking loop responsive to first sine and cosine information signals modulated at a first frequency and representing a first angular position for developing first and second quadrature signals electrically representing the first angular position;

first demodulating means, coupled to said first phase-locking loop, being selectively responsive to the first and second quadrature signals and to first and second input signals to be resolved from a first to a second system of rectangular coordinates for developing demodulated first, second, third and fourth component signals; and first summing means coupled to said first demodulating means for selectively summing the first, second, third and fourth component signals to provide first and second resolved output signals.

19. The resolving system of claim 18 further including:

a second phase-locking loop responsive to second sine and cosine information signals modulated at the first frequency and representing a second angular position for developing third and fourth quadrature signals electrically representing the second angular position;

modulating means, coupled to said first summing means, being responsive to said second resolved output signal for remodulating the second resolved output signal with the first frequency;

second demodulating means, coupled to said modulating means and said second phase-locking loop, being selectively responsive to third and fourth quadrature signals and to a third input signal to be resolved from the first to the second system of rectangular coordinates for developing demodulated fifth, sixth, seventh and eighth component signals; and second summing means coupled to said second demodulating means for selectively summing the fifth, sixth, seventh and eighth component signals to provide third and fourth resolved output signals, the first, third and fourth resolved output signals representing the coordinates in the second system of rectangular coordinates of the first, second and third input signals, respectively.

* * * * *